(12) United States Patent
Dalrymple et al.

(10) Patent No.: US 7,036,082 B1
(45) Date of Patent: Apr. 25, 2006

(54) CONTROLLING COMMUNICATIONS THROUGH A VIRTUAL REALITY ENVIRONMENT

(75) Inventors: William C. Dalrymple, Cary, NC (US); Steve McKinnon, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 990 days.

(21) Appl. No.: 09/666,964

(22) Filed: Sep. 21, 2000

(51) Int. Cl.
*G06F 9/00* (2006.01)

(52) U.S. Cl. ...................... 715/757; 370/352

(58) Field of Classification Search .............. 345/6, 345/8, 156, 157, 419, 771, 782; 351/224; 353/122; 370/352; 375/240.12; 382/103, 382/154, 236; 715/715, 757, 775, 848, 849, 715/850, 852

See application file for complete search history.

(56) References Cited

U.S. PATENT DOCUMENTS 5,999,208 A * 12/1999 McNerney et al. ...... 348/14.08
5,999,525 A * 12/1999 Krishnaswamy et al. ... 370/352
6,405,249 B1* 6/2002 Matsuda et al. ............ 709/224
6,445,694 B1* 9/2002 Swartz ....................... 370/352

* cited by examiner

Primary Examiner—Wellington Chin
Assistant Examiner—John Shew
(74) Attorney, Agent, or Firm—Withrow & Terranova, PLLC

(57) ABSTRACT

A virtual reality system initiates desired real world actions in response to defined events occurring within a virtual environment. A variety of systems, such as communications devices, computer networks, and software applications, may be interfaced with the virtual reality system and made responsive to virtual events. For example, the virtual reality system may trigger a communications system to establish a communications link between people in response to a virtual event. Users, represented as avatars within the virtual environment, generate events by interacting with virtual entities, such as other avatars, virtual objects, and virtual locations. Virtual entities can be associated with specific users, and users can define desired behaviors for associated entities. Behaviors control the real world actions triggered by virtual events. Users can modify these behaviors, and the virtual reality system may change behaviors based on changing conditions, such as time of day or the whereabouts of a particular user.

52 Claims, 9 Drawing Sheets

CONTROLLING COMMUNICATIONS THROUGH A VIRTUAL REALITY ENVIRONMENT

FIELD OF THE INVENTION

The present invention relates to virtual reality systems, and particularly relates to using virtual reality systems to facilitate intuitive communications through communications systems associated with a virtual reality environment.

BACKGROUND OF THE INVENTION

Advances in communications technology continually expand and refine available options for communicating with one another. Key examples come to mind, such as the proliferation of wireless communications devices, audio and video conferencing systems, network and Internet data sharing systems, and electronic collaborative work applications. Ironically, exploiting new communications and information technology becomes increasingly complicated as the range and sophistication of the underlying technologies increases.

Workers in a typical company communicate with one another in a variety of ways. For example, a single person may be associated with a desk phone, a cellular phone, a pager, a personal digital assistant, a computer system, multiple email accounts, and a myriad of other points of contact. The preferred means of contacting such a person will likely vary with changing circumstances-such as time of day or travel status. The efficiency of co-workers attempting to contact this person may be compromised by the sheer number of contact choices available, the number of systems involved (e.g., phone, email, paging), and by not knowing which choice is appropriate at any given time.

Other barriers to efficient and effective communications stem from the increasing complexity of the information involved in our communications. Workers are involved in the development of increasingly complex systems that are oftentimes developed using geographically disperse, multi-disciplinary teams. The ability of these teams to interact with one another and share information intuitively and effectively is critical for success. Further, consumers buy and use increasingly sophisticated systems and services, yet their ability to realize the full value of such systems and services depends on a vendor's ability to supply them with appropriate, readily understood assistance and supporting information.

Unfortunately, existing communication solutions remain loosely integrated at best and do not offer users with an intuitive way to interact with and use any and all of the communications technologies available in a given situation. Accordingly, there remains a need for a system that combines or has access to disparate communications technologies and provides an intuitive interface, preferably visual, that allows people to intuitively interact with other persons and with supporting information and communications systems.

SUMMARY OF THE INVENTION

People intuitively understand how to work within a graphical computer application in which desired functions are represented in a meaningful manner. The present invention simplifies communications between people and systems by linking specific communications functions to events occurring within a virtual reality environment. The virtual reality environment provides a graphical representation of places and objects that can be associated with real-world persons and communications systems. For example, a telephone call might be automatically initiated between two co-workers based on one of the co-workers virtually entering the virtual office of the other.

More generally, in the present invention, a virtual reality system defines a virtual environment and events that can occur within the virtual environment, and initiates desired real world actions when an event occurs. System users, represented as avatars within the virtual environment, generate virtual events based on interacting with virtual objects and locations, as well as with other avatars. In general, virtual entities (e.g., avatars, objects, and locations) are associated with data bearing on the particular real world action triggered in response to an event involving the entity. For example, an avatar entering a virtual office (location) might generate a virtual event that triggers a telephone call or other electronic communications between a person associated with the avatar and a person associated with the virtual office. The associated data in this case could include the telephone numbers or contact information required to establish communications between the persons involved. Other data might specify a computer application to open facilitating data transfer or file sharing activities.

A given virtual event may have a single predefined real world action. For example, one avatar handing a virtual file folder to another avatar might invoke a file sharing application, or simply transfer associated data from one computer system to another. Alternatively, a given event may trigger different real world actions at different times. Thus, entering a virtual office during normal business hours may initiate a phone call to an office telephone, while the same event might trigger a call to an after-hours number, enter voice mail, or launch an email application, if the same event occurs outside of normal business hours.

Multiple event types and multiple possible real world actions associated with each event type may be defined and configured for each virtual entity. Normally, an owner of a given virtual entity performs such configurations. This allows a person to configure the real world actions that are initiated when one of their virtual entities is interacted with in the virtual environment. This allows the person to choose how they wish to be contacted at different times, or in different locations. Additionally, the virtual reality system itself may use changing conditions, such as time of day or the whereabouts of the person, to determine what real world action is initiated in response to a given virtual event.

Virtual event types include object events such as drop, pick up, touch, and use. Location oriented event types include enter, leave, and move. A wide range of other event types such as share, open, and send, may be defined for file sharing and collaborative working. The present invention also supports push technologies allowing multiple users to share a graphical environment. Event types may be extended as needed to support a broad range of virtual activities. The virtual reality system includes interfacing support allowing it to interface, either directly or indirectly, with a wide variety of systems, such as telecommunications networks, computer and information networks, computer applications, and a wide range of other devices and systems. Thus, a broad array of devices, systems, and software may be made responsive to events occurring within the virtual environment. This provides substantial flexibility and makes the system and methods of the present invention suitable for corporate communications and collaborative working, virtual e-commerce, and sophisticated customer support applications.

Those skilled in the art will immediately appreciate the range applications to which the present invention may be applied. Additionally, other aspects and features of the present invention will become apparent to those ordinarily skilled in the art upon review of the following description of specific embodiments of the invention in conjunction with accompanying figures.

DETAILED DESCRIPTION OF THE PREFERRED EMBODIMENTS

Before delving into details regarding the present invention, it is useful to build a framework of discussion and identify certain terminology. Within a virtual reality environment, virtual entities may be used to represent real world entities. A real world entity can be almost anything with examples ranging from an actual person, a communications device or other system associated with a person or persons, a computer network, or a software application. Virtual entities may appear as virtual persons (avatars), or may be virtual objects or virtual locations. For example, a virtual reality system user might create a "virtual office" accessible to other users of the virtual reality system. With the present invention, in many of its various embodiments, virtual entities generally represent or are associated with one or more persons, communications and information systems associated with one or more persons, or computer networks and computer applications.

Referring to the virtual office example, the "owner" of the virtual office might place a virtual calendar, a virtual phone, and a virtual PC on a virtual desk within the office. Another user operating within the virtual environment, possibly as an avatar, might virtually touch the calendar to schedule a meeting with the office owner, pick up the phone to call the office owner, or place a document on the PC to transfer a file to the office owner's real world PC. This theme can be extended with virtually touching a virtual notepad resulting in an email being sent to the office owner. The theme may also be altered somewhat in that the office owner may configure the virtual office such that a preferred communication is initiated whenever another user virtually enters the office itself. Depending upon the whereabouts of the office owner, the communication automatically initiated using email, a mobile telephone, pager, personal digital assistant, an office telephone call, or a home telephone.

Figure 1:
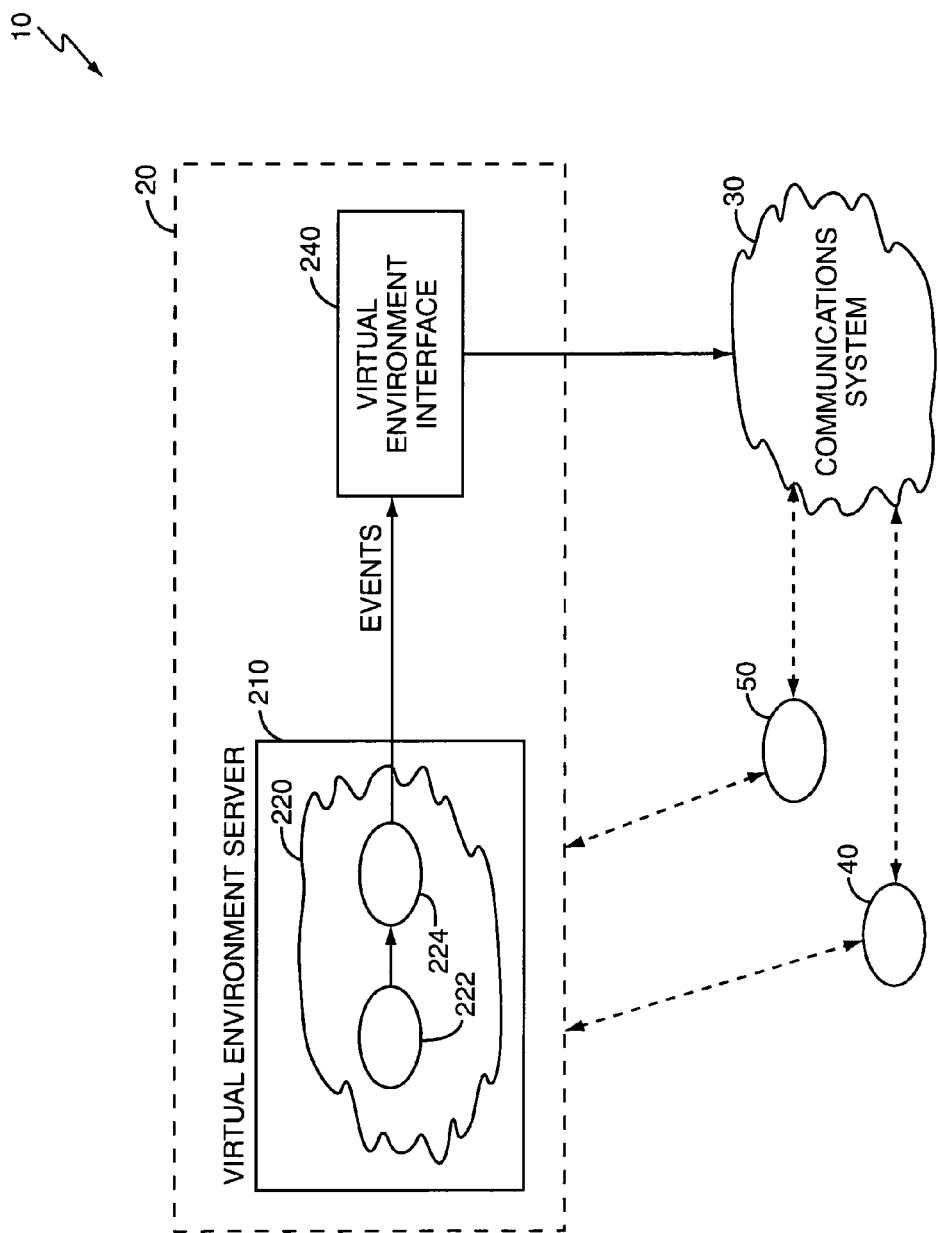
FIG. 1 illustrates an exemplary environment in which the present invention may be advantageously practiced.

With the above context in mind, FIG. 1 illustrates an overall framework 10 for practicing an exemplary embodiment of the present invention. The invention incorporates or operates in conjunction with a virtual reality system 20. The components and related aspects of the virtual reality system 20 are identified in the accompanying drawings using reference number in the 200's for clarity. The virtual reality system 20 includes a virtual environment server 210 hosting a virtual reality environment 220 having virtual entities 222 and 224, and a virtual environment interface 240. While two virtual entities 222 and 224 are illustrated, the virtual reality environment 220 may have any number of virtual entities. The virtual reality system 20 interfaces, directly or indirectly, with a communications system 30.

In the context of FIG. 1, users 40 and 50 represent persons able to interact with the communications system 30 and the virtual reality system 20. More generally, the users 40 and 50 are considered as real world entities associated with the virtual entities 222 and 224. As will be shown in more detail later, the users 40 and 50 will typically have some type of computer to interact with the virtual reality system 20 and some type of communications device to interact with the communications system 30.

The users 40 and 50 are associated with the virtual entities 222 and 224, respectively. More particularly, various communications devices (e.g., phones, pagers, computers, personal digital assistants etc.) associated with the users 40 and 50 are associated with the virtual entities 222 and 224, respectively. Thus, virtual interactions between the virtual entities 222 and 224 under control of the users 40 and 50 may be used to trigger or initiate desired communications functions through the communications system 30 involving the users 40 and 50. The communications system 30 may, for example, be an intra-office PBX, the public switched telephone network (PSTN), a network-based or Internet telephony system, a computer application, a computer network, or other type of information system.

One or more events are defined for the virtual reality environment 220. These events are generated by interactions between the virtual entities 222 and 224. For example, the user 40 may direct his or her corresponding virtual entity 222 to somehow interact (e.g., touch, enter, contact, select) the virtual entity 224 associated with the user 50. This action generates a defined virtual event detected by the virtual environment interface 240. In response to the event, the virtual environment interface 240 initiates a desired communications function that is defined for or associated with the event. For example, the virtual reality system 20 might be configured with telephone numbers corresponding to telephones of users 40 and 50 such that a telecommunications call is initiated between them in response to the virtual event.

The virtual reality system 20 may include one or more computer systems. For example, the virtual environment server 210 may be deployed as one computer system and the virtual environment interface 240 as another computer system. The virtual environment interface 240 may itself be separate from, for example, a network server (not shown), or may be included as part of the network server. The software for hosting the virtual reality environment, configuring and responding to events within the virtual reality environment, and interfacing with other systems to initiate a desired communications function, may be included in a single computer system, spread across multiple computer systems, or any combination thereof.

Figure 2A:
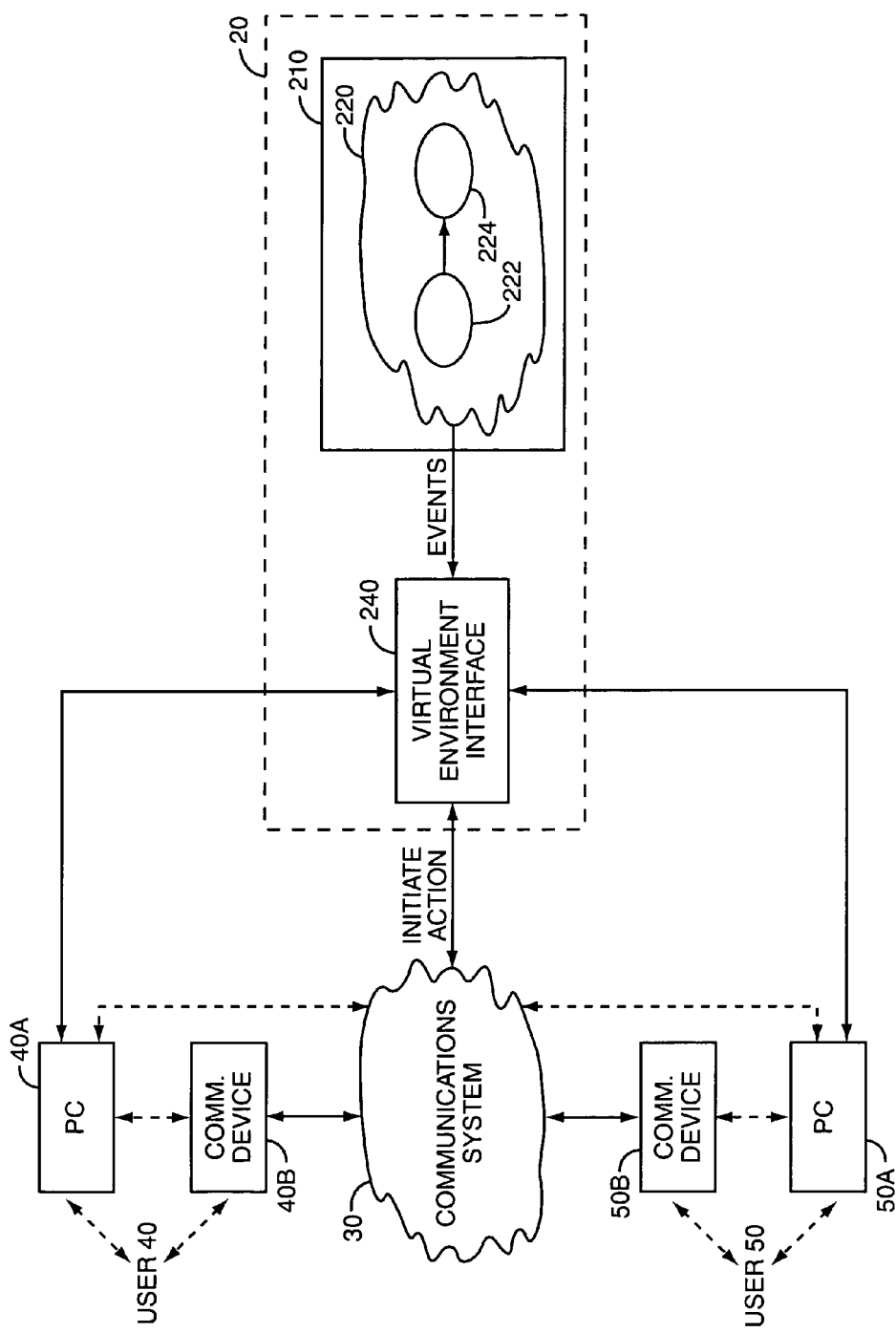
FIG. 2A illustrates an exemplary embodiment of the system of the present invention.

FIG. 2A provides details for one embodiment of the present invention. The user 40 is associated with a PC 40A and a communications device 40B, while the user 50 is associated with a PC 50A and a communications device 50B. Users 40 and 50 use PCs 40A and 40B, respectively, to interact with the virtual reality environment 220. While two users (40 and 50) are illustrated, the virtual reality system 20 supports interaction with any number of users. As shown, the virtual environment interface 240 supports such interaction. Other configurations of the virtual reality system 20 may involve the PCs 40A and 50A interfacing directly with the virtual environment server 210 to enter and interact with the virtual reality environment 220. In such cases, the PCs 40A and 50A may communicate directly with virtual environment server 210 and the virtual environment interface 240.

The user 40 may use PC 40A to cause the virtual entity 222 to interact with the virtual entity 224. This interaction triggers an event that has been defined in the virtual reality environment 220. The virtual environment interface 240 receives notification of the event and, optionally, additional event information. Based on its configuration, the virtual environment interface 240 identifies a desired communications function associated with the event and initiates this desired function in the communications system 30. The desired communications function might be, for example, a communications session between the users 40 and 50 using their corresponding communications devices 40B and 50B, respectively.

FIG. 2A also highlights some of the substantial flexibility associated with the present invention. For example, the communications network 30 might be a computer network and the communications devices 40B and 50B might be computer telephony devices. In this case, the PCs 40A and 50A may be used to communicate with the virtual reality system 20, as well as the communications devices 40B and 50B. Additional communications devices (not shown) may be associated with one or both users 40 and 50. Thus, the virtual reality system 20 may be configured with information about contacting the users 40 and 50 in a variety of ways, such as phone numbers, email addresses, and information regarding preferred methods of contact for different times of the day. Preferably, such information can be dynamically updated by the users 40 and 50 (and other users—not shown—of the virtual reality system 20), or by the virtual reality system 20 to reflect changing preferences for contacting users 40 and 50.

Figure 2B:
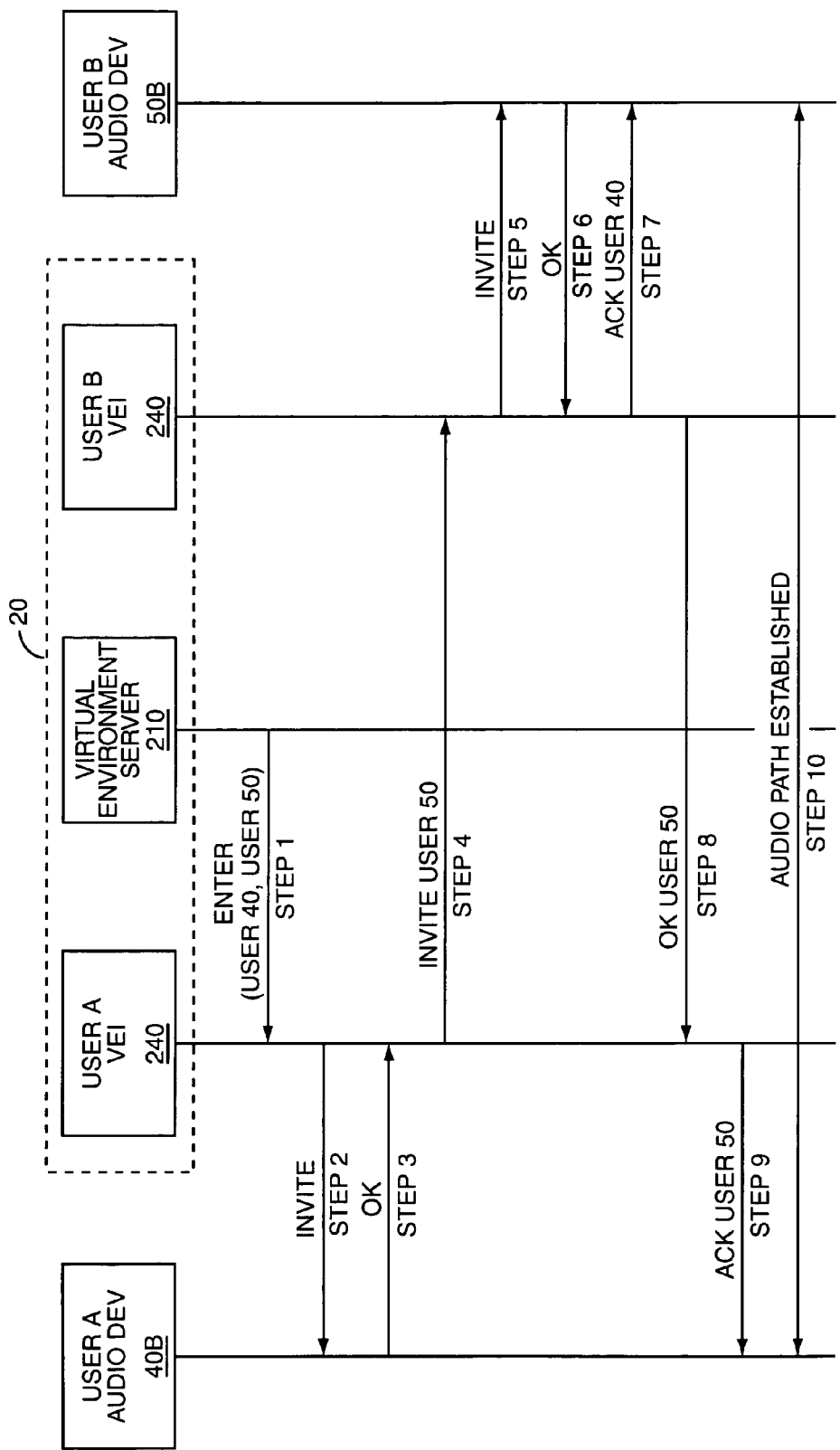
FIG. 2B illustrates an exemplary initiation of a telephony session between a first and second user in accordance with the present invention.

FIG. 2B illustrates a simplified, logical sequence of events for practicing one embodiment of the present invention. In FIG. 2B, the virtual reality system 20 provides a virtual environment interface 240 for each of the users 40 and 50. In such implementations, PCs 40A and 50A corresponding to the users 40 and 50, respectively, may run the virtual environment interfaces 240A and 240B, respectively, allowing the users 40 and 50 to operate within the virtual reality environment 220, as well as processing virtual events. The communications devices 40B and 50B can be, for example, Universal Serial Bus (USB) phones, Telephony Applications Programming Interface (TAPI) compliant phones, or any number of other types of communication devices suitable for PC interfacing. Assume that the virtual entity 224 is configured as a virtual office for the user 50. Further, assume that the virtual entity 222 is configured as an avatar representing the user 40.

Operating under control of the user 40, the virtual entity 222 "enters" the virtual entity 224. This interaction generates an "enter" event (STEP 1). The event notification sent to the virtual environment 240A of the user 40 includes event information identifying the type of event and the virtual entities involved. In the scenario where the PC 40A of the user 40 is hosting the virtual environment interface 240A, the PC 40A invites the associated communications device 40B to initiate a communications session (STEP 2). If the communications device 40B is operative and available, it affirms the communications session initiation (STEP 3). Then, the PC 50A of the user 50 receives the invitation information, which it passes to the communications device 50B (STEP 4). This assumes that the PC 50A of user 50 is hosting the virtual environment interface 240B. If the communications device 50B is operative and available, it affirms the invitation and this is acknowledged for the user 40 (STEPS 5, 6, and 7). Affirmation of the acknowledgement is sent back to the PC 40A (STEP 8), where it is acknowledged (STEP 9) and a communications path between the communications devices 40B and 50B is established (STEP 10). While many methods exist for supporting the above telephone session initiation actions, the Session Interface protocol (SIP) represents a standardized protocol supporting such implementations.

Figure 3:
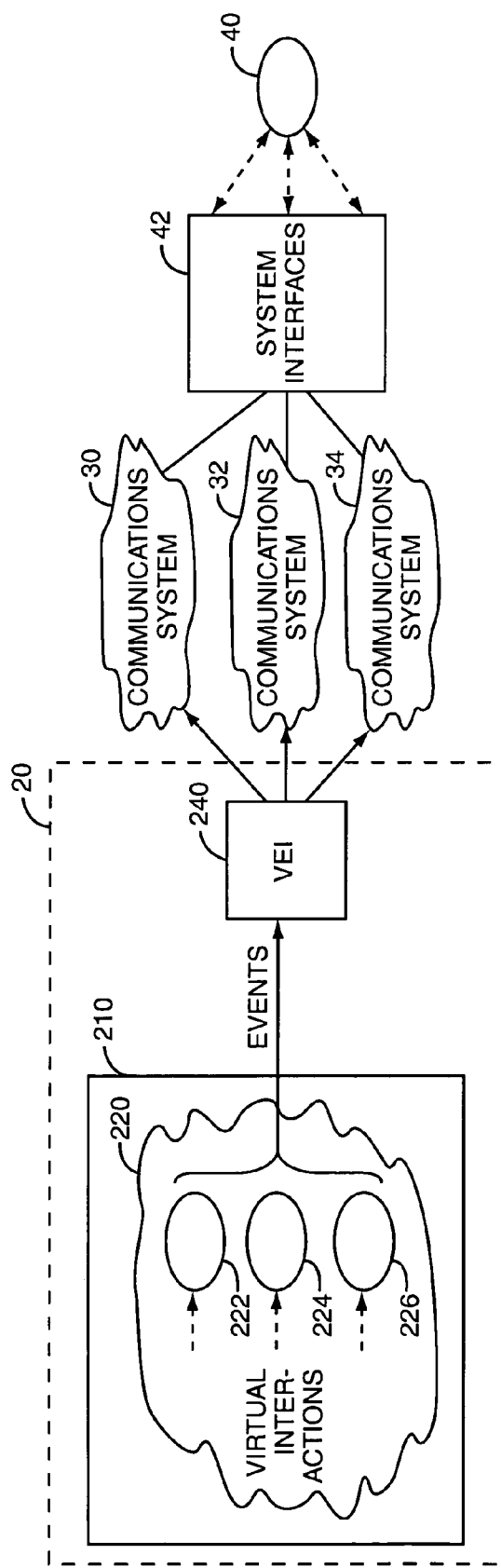
FIG. 3 illustrates an alternate exemplary embodiment of the system of the present invention wherein multiple communications systems are involved.

FIG. 3 illustrates the flexibility of the present invention. Three virtual entities 222, 224, and 226 within the virtual reality environment 220 represent the user 40. Thus, there is a one-to-one correspondence between virtual entities 222, 224, and 226 and the various communications systems 30, 32, and 34 available for contacting the user 40. Each virtual entity 222, 224, and 226 may be associated with a different communications system 30, 32, and 34, respectively. The different communications systems 30, 32, and 34 can be essentially any type of communications system, such as analog or digital telephone networks, cellular networks, computer or other information networks, etc. The system interfaces 42 collectively represent the communications devices or systems used by the user 40 to interact with the communications systems 30, 32, and 34. As such, the particular communications function initiated by the virtual environment interface 240 depends upon which of the virtual entities 222, 224, and 226 are involved in the virtual event.

Figure 4:
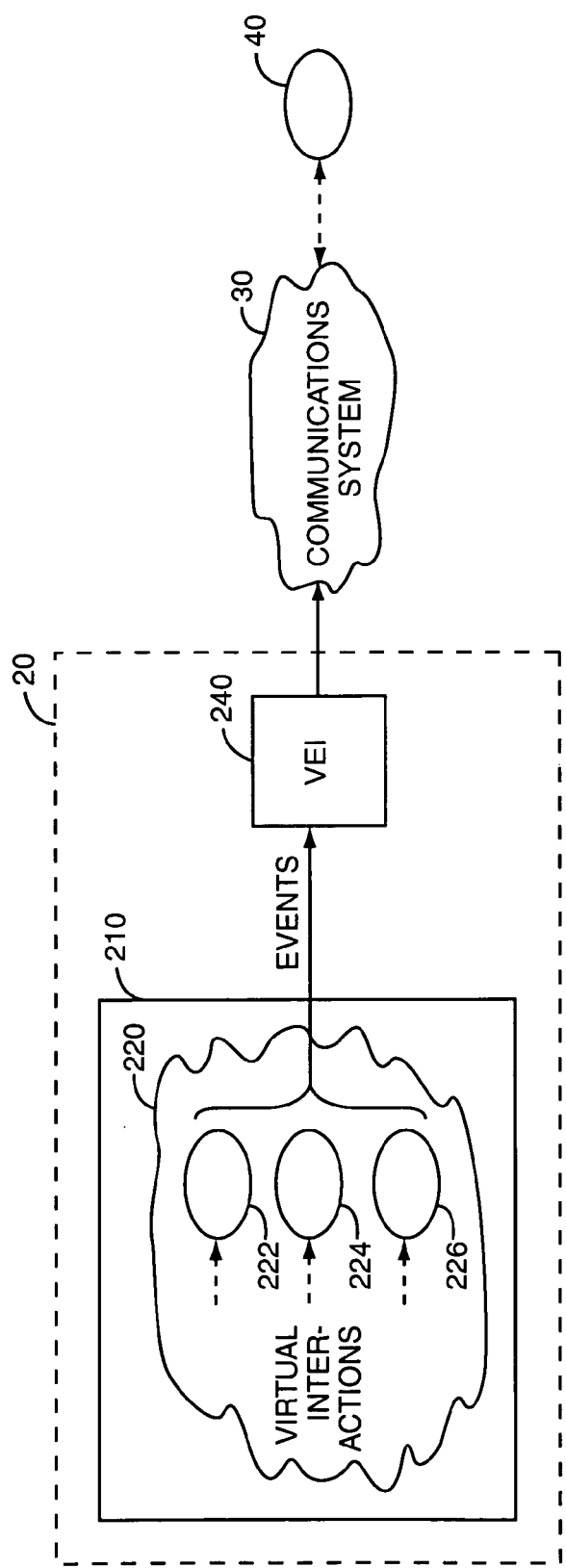
FIG. 4 illustrates an alternate exemplary embodiment of the system of the present invention wherein a single communications system is involved.

FIG. 4 illustrates a many-to-one mapping wherein multiple virtual entities 222, 224, and 226 are all associated with the same communications system 30 for contacting the user 40. In this context, virtual interaction with any of the virtual entities 222, 224, and 226 may be configured to initiate a communications function in the communications system 30 via the virtual environment interface 240. The utility of this arrangement can be better understood by imagining a virtual reality environment 220 where the user 40 has multiple representations within the virtual reality environment 220. For example, the virtual entity 222 might be an avatar representation of the user 40, while the virtual entities 224 and 226 might represent a virtual office and a virtual telephone, respectively, both associated with the user 40.

Figure 5:
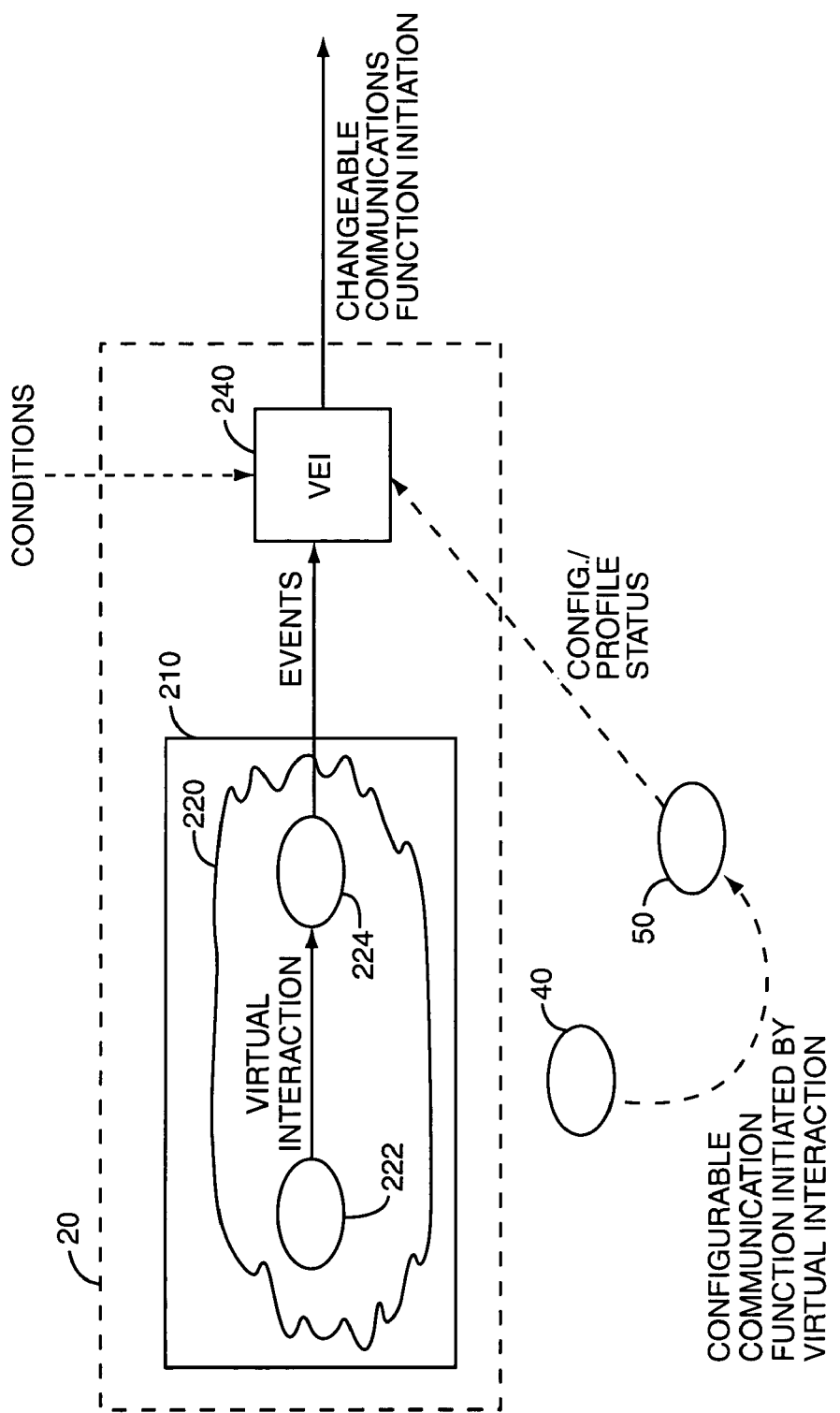
FIG. 5 illustrates the configurable nature of communications functions in one embodiment of the present invention.

FIG. 5 illustrates how user information and certain conditions, such as time of day, may be used to extend the utility of the present invention. Again, virtual entities 222 and 224 correspond to the users 40 and 50, respectively. The users 40 and 50 can interact with the virtual reality system 20 to configure the communication function(s) they desire to be initiated by interactions with their corresponding virtual entities. For example, the particular communications function initiated by the virtual reality system 20 upon detection of a virtual event involving the virtual entity 224 may be based on configuration information, a user profile for example, provided by the user 50.

FIG. 5 further illustrates the ability of the virtual reality system 20 to initiate different communications functions or modify the information used to initiate a given communications function, based on monitoring certain conditions. Intuitively, one imagines that a preferred method of contacting a given individual might change at different times during the day. During normal working hours, a desk telephone may be preferred, but during lunch or after hours, a mobile telephone may be preferred. At still other times, emailing or paging might represent the best or perhaps only way of contacting the given person.

In these and other scenarios, the virtual reality system 20 may be configured to consider one or more criteria for evaluating one or more conditions to determine which communications function is preferred at any given time. While conditions are illustrated as being externally provided to the virtual environment interface 240, the virtual reality system 20 may determine one or more of the conditions used to select preferred communications functions for a given virtual event at a given time. System time and date represents the type of conditional data that is easily maintained by the virtual reality system 20, while monitored locations of workers within an office complex might represent the type of conditional information provided by external sensing or monitoring systems.

Figure 6:
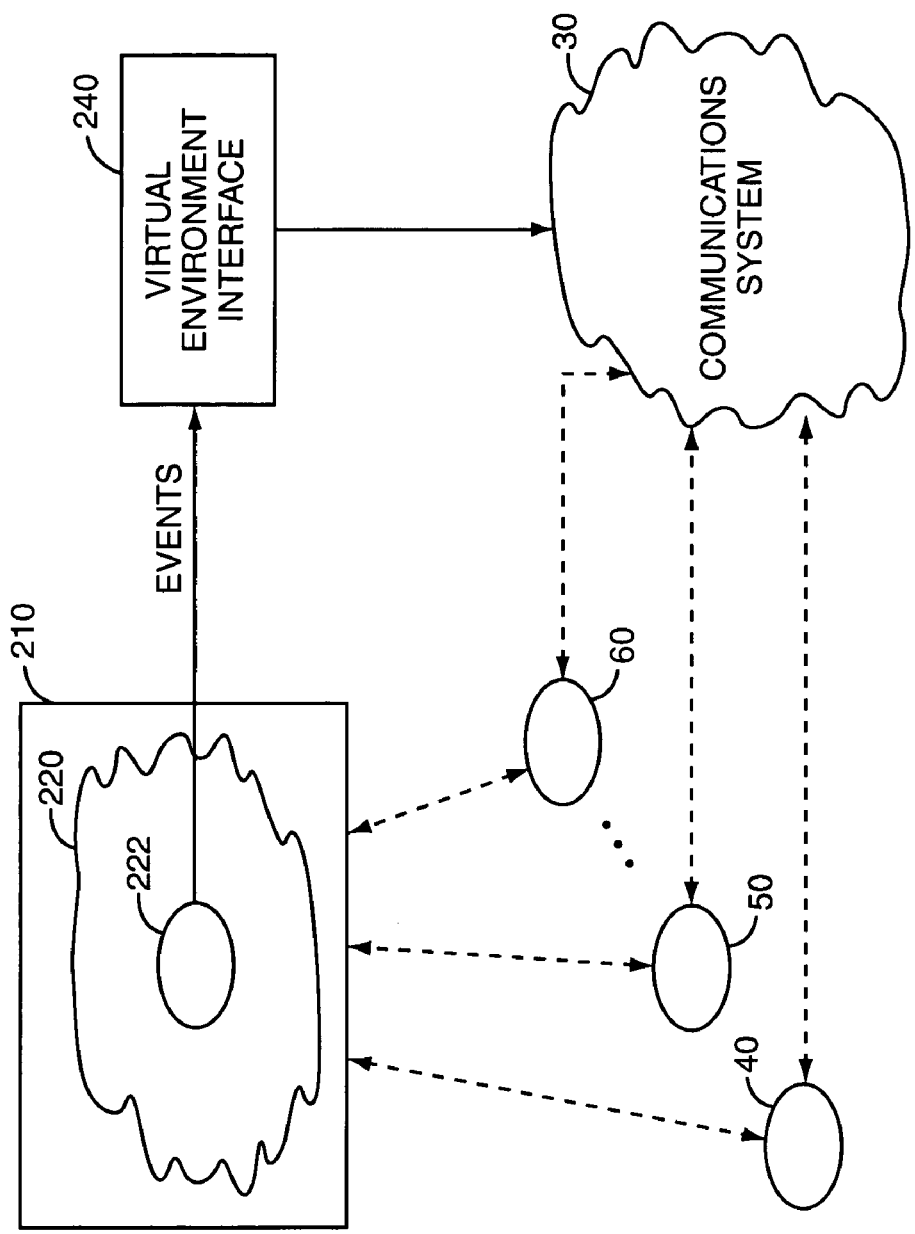
FIG. 6 illustrates how a single virtual entity may be linked to a common communications function, such as a conference call, in the present invention.

FIG. 6 illustrates a configuration alluded to earlier, wherein a communications system 30, such as a video conferencing system, is represented as a virtual entity 222 within the virtual reality environment 220. In this way, the virtual reality environment 220 may be constructed to provide an intuitive way for users 40, 50, and 60, to join in a conference supported by the communications system 30. One technique is to configure the virtual entity 222 as a virtual conference room within the virtual reality environment 220. Configuration information would then be defined and stored so that the virtual reality system 20 is capable of initiating a connection between the users 40, 50, and 60, and the communications system 30 when the individual users interact with the virtual entity 222.

Thus, FIG. 6 is just one example of the flexibility of the present invention in representing users, communication systems, communication devices, computers, and various other real world entities as virtual entities (222, etc.) within the virtual reality environment 220. The particular communications function initiated by the virtual reality system 20 may then depend upon what specific kind of real world entity is represented by a given virtual entity.

Figure 7:
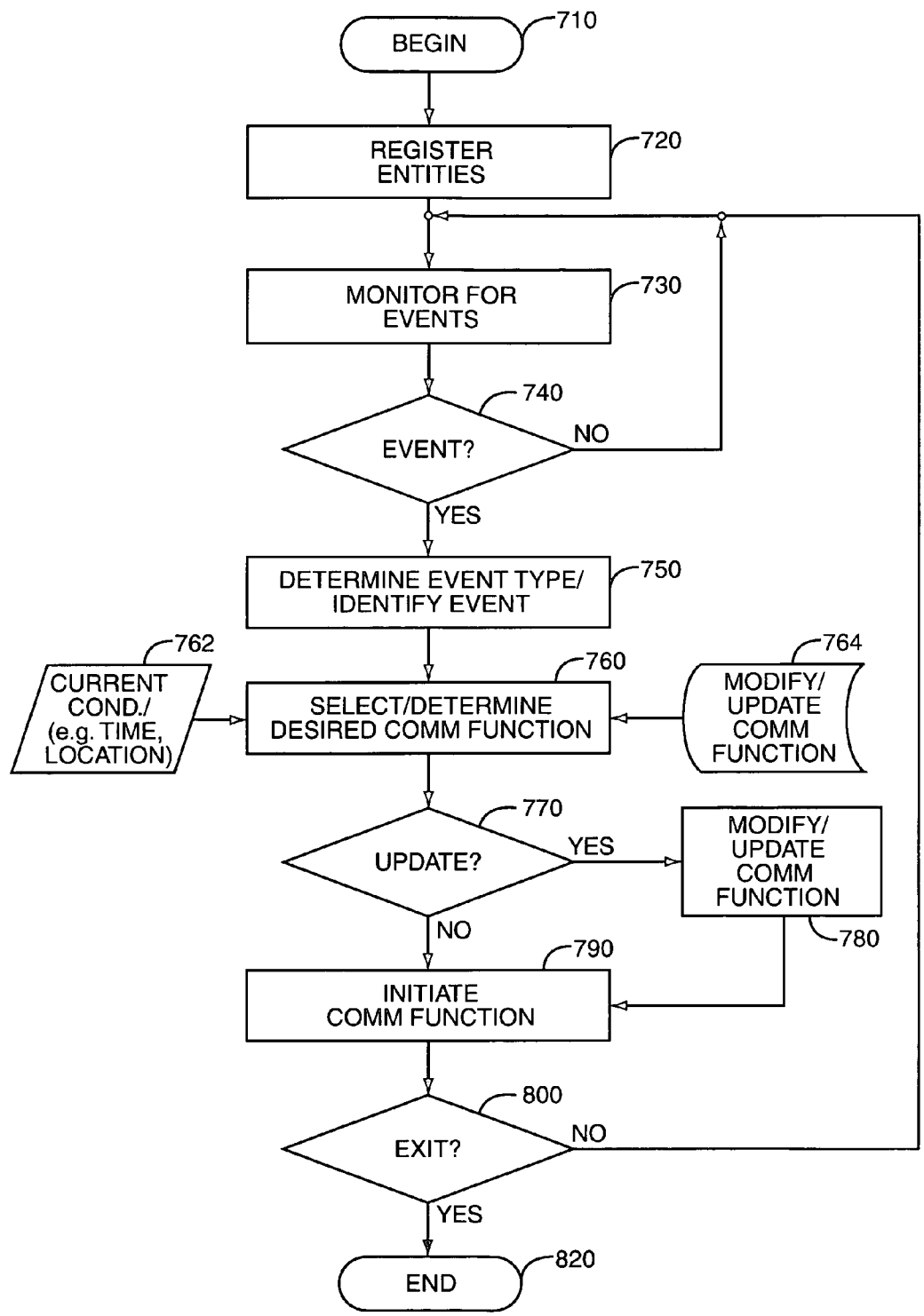
FIG. 7 provides exemplary, simplified program logic for initiating communications functions in response to certain events occurring within the virtual reality environment.

FIG. 7 illustrates operating logic for one aspect of operation of the virtual reality system 20 in some embodiments of the present invention. Operation begins (block 710) with the virtual reality system 20 registering one or more real world entities (people, systems, software, etc.) so that desired associations may later be made between the corresponding virtual entities and the real world entities (block 720). Once the real world entities are registered, including the establishment of any user profiles and conditional criteria, the virtual reality system 20 monitors for virtual events (block 730). In the absence of any virtual events, the virtual reality system 20 continues monitoring (block 730). Upon occurrence of one or more defined events (block 740), the virtual reality system, if necessary, determines the event type or identifies the specific event(s), and processes any supporting event information (block 750).

Note that in some embodiments, the virtual reality system 20 may have only one type of event. In this case, the event notification sent from the virtual environment server 210 to the virtual environment interface 240 identifies the virtual entities involved in the event. Other embodiments may have many types of events. Some embodiments may define the following events: Touch(entity1, entity 2), PickUp(entity1, entity2), Drop(entity1, entity2), Enter(entity1, entity2), Leave(entity1, entity2), Share(entity1, entity2), and Push (entity1, entity2). Supporting data, much like functional arguments included with function calls in conventional programming languages, identifies the particular entities involved in a given virtual event and information bearing on the type of event. This allows the virtual reality system 20 to undertake one or more specific communications functions based on the type of event and the particular virtual entities involved in the event. Of course, the present invention is not limited to the above event definitions or the above format for indicating which virtual entities are involved in a particular event.

Once the event or events and the involved virtual entities are identified, the virtual reality system 20 determines which particular communications function(s) to initiate (block 760) based on either current condition criteria (block 762), on configuration data or user profiles (block 764), or any combination thereof. If current conditions or configuration data indicate the need to change or modify the desired communications function (block 770), the virtual reality system 20 updates or modifies the desired communications function(s) (block 780) and then initiates the updated or modified communications function (block 790). If no update or modification is required (block 770), the virtual reality system 20 simply initiates the configured communications function (block 790). If the virtual reality environment 220 is to remain active (block 800), the system returns to monitoring for virtual events (block 730), otherwise processing ends (820).

Figure 8:
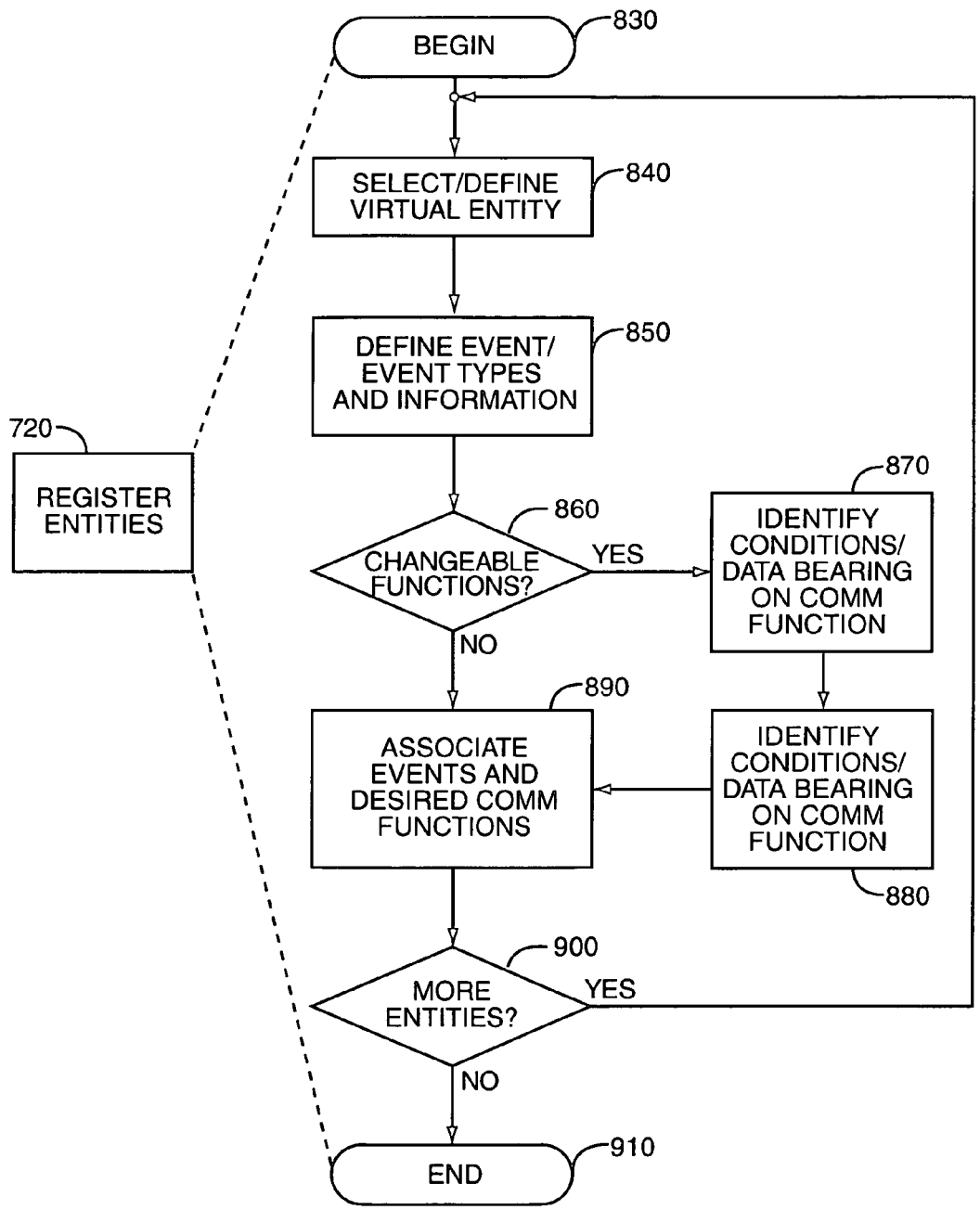
FIG. 8 provides additional details for certain aspects of the program logic of FIG. 7.

FIG. 8 provides additional details regarding a portion of the operating logic introduced in FIG. 7. Specifically, additional details appear for a method of implementing the process of registering entities (block 720 of FIG. 7). Registering begins (block 830) by defining a virtual entity, if necessary, and associating the virtual entity with a real world entity (e.g., person, communication device or system) (block 840). One or more events, possibly of different types, are defined for the selected virtual entity (block 850). If the virtual reality system 20 is to support changeable communications functions (block 860), the conditions and data bearing on the selection of a preferred communications function from one or more defined communications function are defined (block 870). The conditional evaluations to be applied to this information are then defined to establish the criteria that will be used, at a particular time, to select a preferred communications function (block 880). Once this is done, or if there are no conditional evaluation criteria to be established (block 860), the association between virtual events and the desired communications function is established (block 890).

This process may be thought of as "mapping" a set of defined virtual events into a set of desired communications functions. As noted, this mapping may be one-to-many, as in situations where one virtual event is associated with the initiation of more than one communications function. Alternatively, the mapping may be many-to-one, wherein multiple virtual events are associated with a common communications function. Further mapping subtlety arises from the ability to have the virtual reality system 20 dynamically change or update the mapping from virtual events to desired communications functions.

Once the event-to-function mapping is completed for given events and a given entity, the virtual reality system 20 may return (block 900) to defining and associating more events and entities (block 840). If there are no more entities to define and associate (block 900), processing ends (block 910).

The foregoing descriptions and supporting drawings illustrate exemplary embodiments for practicing the present invention. However, as will be readily appreciated by those skilled in the art, the present invention allows significant variation in both implementation and operation. For example, the conditional criteria, if used, to determine which of several possible communications functions are to be initiated upon occurrence of a given event may be readily changed or expanded. Further, the manner of interfacing the virtual reality system 20 to one or more communications systems 30 may be changed as needed. For example, the virtual reality system 20 or parts thereof may be implemented as part of a computer network that hosts additional functionality, such as application and data support for a number of system users. In this circumstance, the computer network may include a hardware or software interface to the PSTN, a local PBX, the Internet, or any number of other communications systems. In such environments, then, the interface between the virtual reality system 20 and any supporting communications system 30 is intrinsic.

No limitations should be construed for the present invention in light of the foregoing discussion of its exemplary embodiments. Indeed, the present invention is limited only by the scope of the claims appended thereto, and the reasonable equivalents thereof.

What is claimed is:

1. A method comprising:
   monitoring for an occurrence of a virtual event generated by an interaction with a first virtual entity within a virtual reality environment;
   selecting a communications function based at least in part on conditional data; and
   initiating the communications function that has been associated with the virtual event upon the occurrence of the virtual event;
   wherein the communications function provides for communications with a real world entity associated with the first virtual entity such that the communications function is set up outside the virtual reality environment and the communication function is not routed through the virtual reality environment.

2. The method of claim 1 wherein the virtual event is generated by a second virtual entity interacting with the first virtual entity within the virtual reality environment, and initiating the communications function comprises initiating a communication between real world entities associated with the first and second virtual entities upon occurrence of the virtual event.

3. The method of claim 1 wherein the virtual event comprises an interaction between a second virtual entity and the first virtual entity within the virtual reality environment, and further wherein initiating Ute communications function comprises initiating a telephony session between real world entities associated with the first and second virtual entities.

4. The method of claim 3 wherein initiating the telephony session comprises initiating telecommunications between a first telecommunications device associated with the first virtual entity and a second telecommunications device associated with the second virtual entity.

5. The method of claim 1 wherein the first virtual entity is associated with a first telecommunications device, and further wherein initiating the communications function comprises initiating a telecommunications call to the first telecommunications device.

6. The method of claim 1 wherein the virtual event is generated by an interaction between a second virtual entity and the first virtual entity within the virtual reality environment, and further wherein initiating the communications function comprises initiating an email message from a computer system associated with the second virtual entity to a computer system associated with the first virtual entity.

7. The method of claim 1 wherein the virtual event is generated by an interaction between a second virtual entity and the first virtual entity within the virtual reality environment, and further wherein initiating the communications function comprises initiating an electronic file transfer between a computer system associated with the second virtual entity and a computer system associated with the first virtual entity.

8. The method of claim 7 further comprising:
   defining a plurality of events that can be generated by a plurality of different interactions between the first and second virtual entities;
   associating respective ones of the plurality of events with respective ones of a plurality of communication functions;
   identifying a specific one of the plurality of events upon occurrence of one of the plurality of events;
   selecting a corresponding one of the plurality of communication functions from among the plurality of communication functions based on the specific one of the plurality of events; and
   initiating the corresponding one of the plurality of communication functions.

9. The method of claim 1 wherein the virtual event is generated by an interaction between a second virtual entity and the first virtual entity within the virtual reality environment, and further wherein initiating the communications function comprises pushing a representation of a graphical environment at a computer system associated with the second virtual entity to a computer system associated with the first virtual entity.

10. The method of claim 1 further comprising:
    defining at least one additional communications function associated with the virtual event;
    defining a criteria for determining whether to initiate the communications function or the at least one additional communications function;
    evaluating the criteria upon occurrence of the virtual event; and
    initiating one of the communications function and the at least one additional communications function based on the evaluation of the criteria.

11. The method of claim 10 wherein the criteria relates to the conditional data.

12. The method of claim 11 wherein the criteria is a known location of a user associated with the first virtual entity.

13. The method of claim 11 wherein the virtual event is generated by an interaction between a second virtual entity and the first virtual entity within the virtual reality environment, and further wherein the criteria is a known location of a user associated with the second virtual entity.

14. The method of claim 11 wherein the criteria is a time of day.

15. The method of claim 10 wherein the criteria does not relate to the conditional data.

16. The method of claim 1 wherein the virtual event is generated by an interaction between a second virtual entity and the first virtual entity within the virtual reality environment, and further comprising:
initiating a telephony session between a first user associated with the first virtual entity and a second user associated with the second virtual entity using a first contact number for the first user during a first period of time; and
initiating a telephony session between the first user associated with the first virtual entity and the second user associated with the second virtual entity using a second contact number for the first user during a second period of time.

17. The method of claim 1 wherein initiating the communications function comprises one in a group of actions consisting of initiating a telephony session, initiating a computer application, initiating an email transmission, initiating an electronic file transfer, initiating an electronic conference, initiating an electronic data sharing session, and initiating a virtual environment working session.

18. The method of claim 1 wherein monitoring for an occurrence of a virtual event generated by an interaction with a first virtual entity comprises monitoring for the occurrence of the virtual event generated by the interaction with the first virtual entity selected from the group consisting of: a virtual object and a virtual location.

19. The method of claim 1 wherein selecting a communications function based at least in part on conditional data comprises selecting a communications function based on conditional data selected from the group consisting of: system time, system date, real world location of a first real world entity associated with the first virtual entity, and type of first virtual entity with which the interaction occurs.

20. The method of claim 1 wherein selecting a communications function comprises selecting from the group consisting of: email and file transfer.

21. A method comprising:
representing a real world entity as at least one virtual entity within a virtual environment;
associating at least one communications function relevant to the real world entity with a defined virtual event that can be generated by interacting with the at least one virtual entity; and
selecting the at least one communications function based at least in part on conditional data such that the at least one communications function is set up outside the virtual reality environment and the communication function is not routed through the virtual reality environment.

22. The method of claim 21 further comprising
monitoring for an occurrence of the defined virtual event; and
initiating the at least one communications function upon the occurrence of the defined virtual event.

23. The method of claim 21 wherein the defined virtual event is generated by an interaction between the at least one virtual entity and an additional virtual entity associated with another real world entity, and initiating the at least one communications function comprises initiating a communication between the real world entity associated with the at least one virtual entity and the real world entity associated with the additional virtual entity upon occurrence of the defined virtual event.

24. The method of claim 21 wherein associating at least one communications function relevant to the real world entity with a defined virtual event that can be generated by interacting with the at least one virtual entity comprises:
associating a plurality of communications functions relevant to the real world entity with the defined virtual event; and
defining at least one criteria, said at least one criteria related to the conditional data for selecting a preferred communications function from the plurality of communications functions.

25. The method of claim 24 further comprising:
evaluating the at least one criteria upon occurrence of the defined virtual event to determine the preferred communications function; and
initiating the preferred communications function.

26. The method of claim 25 wherein initiating the at least one communications functions comprises initiating at least one in a group of actions consisting of initiating a telephony session, initiating a computer application, initiating an email transmission, initiating an electronic file transfer, initiating an electronic conference, initiating an electronic data sharing session, and initiating a virtual environment working session.

27. The method of claim 21 further comprising:
associating respective ones of a plurality of communications functions relevant to the real world entity with corresponding ones of a plurality of defined virtual events that can be generated by different interactions with the at least one virtual entity;
selecting a corresponding one of the plurality of communications functions upon occurrence of a given one of the plurality of defined virtual events; and
initiating the corresponding one of the plurality of communications functions.

28. The method of claim 21 wherein representing a real world entity as at least one virtual entity within a virtual environment comprises representing the real world entity with a plurality of virtual entities, and further wherein associating at least one communications function relevant to the real world entity with a defined virtual event that can be generated by interacting with the at least one virtual entity comprises associating respective ones of a plurality of communications functions with respective ones of the plurality of virtual entities.

29. A method comprising:
associating a virtual entity in a virtual reality environment with a person;
linking a virtual event defined for the virtual entity with a desired communications function relevant to the person based at least in part on conditional data;
monitoring for an occurrence of the virtual event;
monitoring conditions to determine the conditional data; and
initiating the desired communications function upon occurrence of the virtual event and the conditional data such that the desired communications function is set up outside the virtual reality environment and the communication function is not routed through the virtual reality environment.

30. The method of claim 29 further comprising:
linking the virtual event defined for the virtual entity with a plurality of communications functions;

defining at least one criteria related to the conditional data for selecting a preferred one of the plurality of communications functions at a given time;

evaluating the at least one criteria upon occurrence of the virtual event to determine the preferred one of the plurality of communications functions; and initiating the preferred one of the plurality of communications functions.

31. A computer readable media comprising software for instructing a computer to:

monitor for an event notification signifying an event occurring within a virtual reality environment;

monitor for a condition relating to conditional data;

associate the event notification with a desired communications function; and initiate the desired communications function upon occurrence of the event notification and the conditional data, wherein the desired communications function provides for communications with a real world entity associated with virtual entity represented in the virtual reality environment such that the desired communications function is set up outside the virtual reality environment and the communication function is not routed through the virtual reality environment.

32. The computer readable media of claim 31 wherein the instructions to monitor for the event notification include monitoring for the occurrence of the event generated by an interaction between a first virtual entity and a second virtual entity, and the instructions to initiate the desired communications function include initiating a communication between real world entities associated with the first and second virtual entities upon occurrence of the event notification.

33. The computer readable media of claim 31 for further instructing the computer to:

process event data received as part of the event notification;

determine information bearing on execution of the desired communications function from the event data;

configure initiation information using the information bearing on the execution of the desired communications function; and initiate the desired communications function using the initiating information.

34. The computer readable media of claim 31 for further instructing the computer to:

process the event notification to identify an occurrence of a certain event within the virtual reality environment;

select one from a plurality of desired communications functions based on identifying the occurrence of the certain event; and initiate the one desired communications function selected from the plurality of desired communications functions.

35. The computer readable media of claim 31 for further instructing the computer to:

process the event notification to identify a specific event;

determine a specific desired communications function corresponding to the specific event; and initiate the specific desired communications function.

36. The computer readable media of claim 31 wherein instructing the computer to monitor for a condition relating to conditional data comprises determining a status condition associated with the desired communications function upon receipt of the event notification; and modifying the desired communications function based on the status condition.

37. The computer readable media of claim 36 wherein said instruction to determine the status condition comprises determining a system time.

38. The computer readable media of claim 37 wherein said instruction to modify the desired communications function based on the status condition comprises initiating the desired communications function using different initiation information for different times.

39. The computer readable media of claim 37 wherein said instruction to modify the desired communications function based on the status condition comprises initiating the desired communications function on a different one of a number of associated communications systems at different times.

40. A computer readable media comprising software for instructing a computer system to:

interface with a virtual reality environment to receive event notifications generated by events within a virtual reality environment;

monitor for conditions relating to conditional data associate a particular one of the event notifications and the conditional data with a particular communications function; and initiate the particular communications function upon receipt of the particular one of the event notifications and the conditional data such that the particular communications function is set up outside the virtual reality environment and the communication function is not routed through the virtual reality environment.

41. The computer readable media of claim 40 for further instructing the computer system to:

associate the particular one of the event notifications with a plurality of communications functions;

determine a preferred one of the plurality of communications functions upon occurrence of the particular one of the event notifications based on evaluating at least one defined criteria; and initiating the preferred one of the plurality of communications function.

42. The computer readable media of claim 41 for further instructing the computer system to receive information from a user identifying the plurality of communications functions.

43. The computer readable media of claim 40 for further instructing the computer system to:

receive configuration information from a user associated with the particular one of the event notifications; and configure the particular communications function based on the configuration information.

44. The computer readable media of claim 40 for flintier instructing the computer system to select one of a plurality of communications functions as the particular communications function based on a configuration value upon occurrence of the particular one of the event notifications.

45. The computer readable media of claim 44 for further instructing the computer system to receive information determining the configuration value from a user associated with the particular one of the event notifications.

46. A virtual reality interface system comprising:

a first communications interface adapted to receive an event notification from a virtual reality system, said event notification associated with conditional data;

a processing system adapted to determine a desired communications function based on the event notification and the conditional data; and a second communications interface adapted to provide initiating information sufficient to initiate the desired communications function such that the desired communications function is set up outside the virtual reality environment and the communication function is not routed through occurs outside the virtual reality environment.

47. The system of claim 46 wherein the first communications interface comprises a network communications interface adapted to transfer information between a virtual reality system server and said virtual reality interface system.

48. The system of claim 46 wherein said second communications interface comprises a network communications interface adapted to transfer the information sufficient to initiate the desired communications function between said virtual reality interface system and at least one networked computer system associated with the desired communications function.

49. The system of claim 46 wherein said virtual reality interface system hosts virtual reality environment software, and further wherein said first communications interface comprises a software interface with the virtual reality environment software.

50. The system of claim 46 wherein the desired communications function is a computer telephony function, and further wherein said second communications interface is adapted to communicate with a computer telephony system.

51. A system comprising:
means for monitoring for an occurrence of a virtual event generated by an interaction between a first virtual entity and a second virtual entity within a virtual reality environment;
means for selecting a communications function based at least in part on conditional data; and
means for initiating the communications function that has been associated with the virtual event involving the first virtual entity upon occurrence of the virtual event,
wherein the communications function provides for communications with a real world entity associated with one of the first and second virtual entities such that the communications function is set up outside the virtual reality environment and the communication function is not routed through the virtual reality environment.

52. The system of claim 51 said means for monitoring for the occurrence of the virtual event monitors for the occurrence of the virtual event generated by an interaction between the first virtual entity and a second virtual entity, and said means for initiating the communications function initiates the communication between real world entities associated with the first and second virtual entities upon occurrence of the virtual event.

* * * * *